United States Patent [19]

Matsuno et al.

[11] Patent Number: 4,673,188
[45] Date of Patent: Jun. 16, 1987

[54] BOOT WITH BRACING BOSS PORTION FOR UNIVERSAL JOINT

[75] Inventors: Yutaka Matsuno; Yasunori Hatanaka, both of Toyota; Hirokazu Shimizu, Okazaki; Masahiro Ishigaki, Tsu; Hiroshi Harada, Tsu; Michihiro Kawada, Tsu; Yasukuni Wakita, Yao, all of Japan

[73] Assignee: Toyota Jidosha Kabushiki Kaisha Toyo Tire & Rubber Co., Ltd., Toyota, Japan

[21] Appl. No.: 891,729

[22] Filed: Jul. 29, 1986

[30] Foreign Application Priority Data

Sep. 9, 1985 [JP] Japan .................. 60-137720[U]

[51] Int. Cl.$^4$ .................. F16J 3/04; F16J 15/52
[52] U.S. Cl. .................. 277/212 FB; 277/30; 74/18.2
[58] Field of Search .................. 277/30, 31, 33, 212 R, 277/212 FB; 74/18, 18.1, 18.2

[56] References Cited

U.S. PATENT DOCUMENTS

| | | | |
|---|---|---|---|
| 3,547,473 | 12/1970 | Gottschald | 74/18 X |
| 3,830,083 | 8/1974 | Hadick et al. | 277/212 FB X |
| 3,842,621 | 10/1974 | Mazziotti | 277/212 FB X |
| 4,278,262 | 7/1981 | Mizutani et al. | 277/212 FB |

FOREIGN PATENT DOCUMENTS

| | | | |
|---|---|---|---|
| 1069480 | 11/1959 | Fed. Rep. of Germany | 277/212 FB |
| 1342949 | 10/1963 | France | 277/212 FB |
| 628386 | 11/1961 | Italy | 277/212 FB |

Primary Examiner—Robert S. Ward
Attorney, Agent, or Firm—Flynn, Thiel, Boutell & Tanis

[57] ABSTRACT

A bellows-form boot for universal joint which is formed integrally of a large-diameter cylindrical portion and a small-diameter cylindrical portion at both ends, the former being adapted to be fitted to a joint case housing therein the universal joint and the latter to a driving shaft, a central annular bellows portion having ridge portions whose diameters are tapered down toward the small-diameter portion, and a bracing boss portion extending between the large-diameter portion and the bellows portion. The boss portion has a wall thickness of 2 to 3 times the average wall thickness of the bellows portion and is profiled so that the inner face thereof may abuttingly contact with the edge face of the joint case and the outer face thereof is flush with the outer face of the bellows portion in the mutual joining area. The bellows portion has, at its zone adjacent to the boss portion extending from the end to the crest of the first ridge portion thereof, wall thicknesses gradually increasing from the latter to the former, whose maximum is a half the wall thickness of the boss portion.

3 Claims, 4 Drawing Figures

BOOT WITH BRACING BOSS PORTION FOR UNIVERSAL JOINT

BACKGROUND OF THE INVENTION

1. Field of the Invention

This invention relates to a bellows-form boot used for covering a universal joint.

2. Related Art Statement

Wheel shafts of an automobile are driven to rotate by means of driving shafts through universal joints each housed in a joint case. In order that extraneous matter such as sand, dust, etc. may not enter into the joint case, a bellows-form boot moulded of an elastomeric material like rubber is attached to cover between the joint case and the driving shaft on the connection side and further, a grease is sealed within the boot thereby to bring the universal joint into lubrication.

Heretofore, for example, a universal joint boot as illustrated in FIG. 3 is known which is shaped integrally of a large-diameter cylindrical portion (3) to be fitted on the outer periphery of a joint case (2) on the wheel (1) side, a small-diameter cylindrical portion (5) to be fitted on the outer periphery of a driving shaft (4) and a bellows portion (7) interconnecting between the former and the later, which portion has a constant wall thickness over the whole length of it and includes 3 to 6 ridge portions (6), the large-diameter portion (3) and the small-diameter portion (5) being fastened fixedly with fastening members (8, 8') such as retaining band. One example of such type of boot for universal joint is disclosed in Japanese Patent Publication No. 59-17289 (1984) now patented.

With the foregoing kind of prior art boot for universal joint, when the joint is flexed at a joint angle ($\theta$) of more than 30° as illustrated in FIG. 4, however, the boot is deformed and deflexed in such a manner that the crest (6a) of a first ridge portion (6) of the bellows portion (7) close to the large-diameter portion (3) comes into point contact with the outer face (9) of the largediameter portion (3) at the axially inner end thereof, and as a result, the surface pressure on that area (9) locally increases. The large-diameter portion (3) and the first ridge portion (6) are equal in the angular velocity about the axis, but differ greatly in the peripheral velocity at the contact point owing to the differeince in radius. Consequently, cracking is liable to occur because of friction between both portions (3,6), with the result that longevity of the boot becomes shortened.

Further problem is that upon rotation of more than 1600 r.p.m., the grease hermetically filled in the space within the boot exerts a centrifugal action on the largest diameter zone of the bellows portion (7), namely the zone of it adjacent to the large-diameter portion (3) and the zone is dilated radially outwardly. As a result, the zone interferes in other component parts surrounding it nearby.

Therefore, any improvement in these problems over known boots for universal joint has been earnestly desired.

SUMMARY OF THE INVENTION

In order to solve the problems of foregoing boots for universal joints which have remained unsolved, this invention has been accomplished.

That is, this invention has for a primary object to provide a bellows-like boot for universal joints having a long life by enhancing the strength of its bellows portion in its area adjacent to the large-diameter portion.

Figure 1:
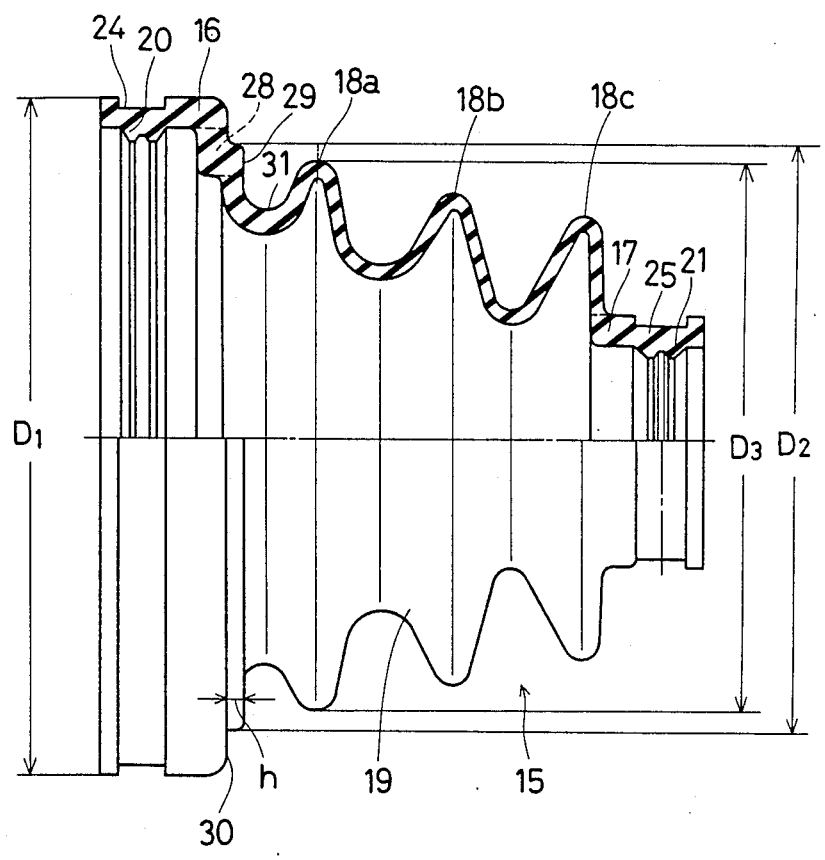
FIG. 1 is a vertical sectional view of one example of a boot for universal joint according to this invention, with one-half thereof broken away.
Figure 2:
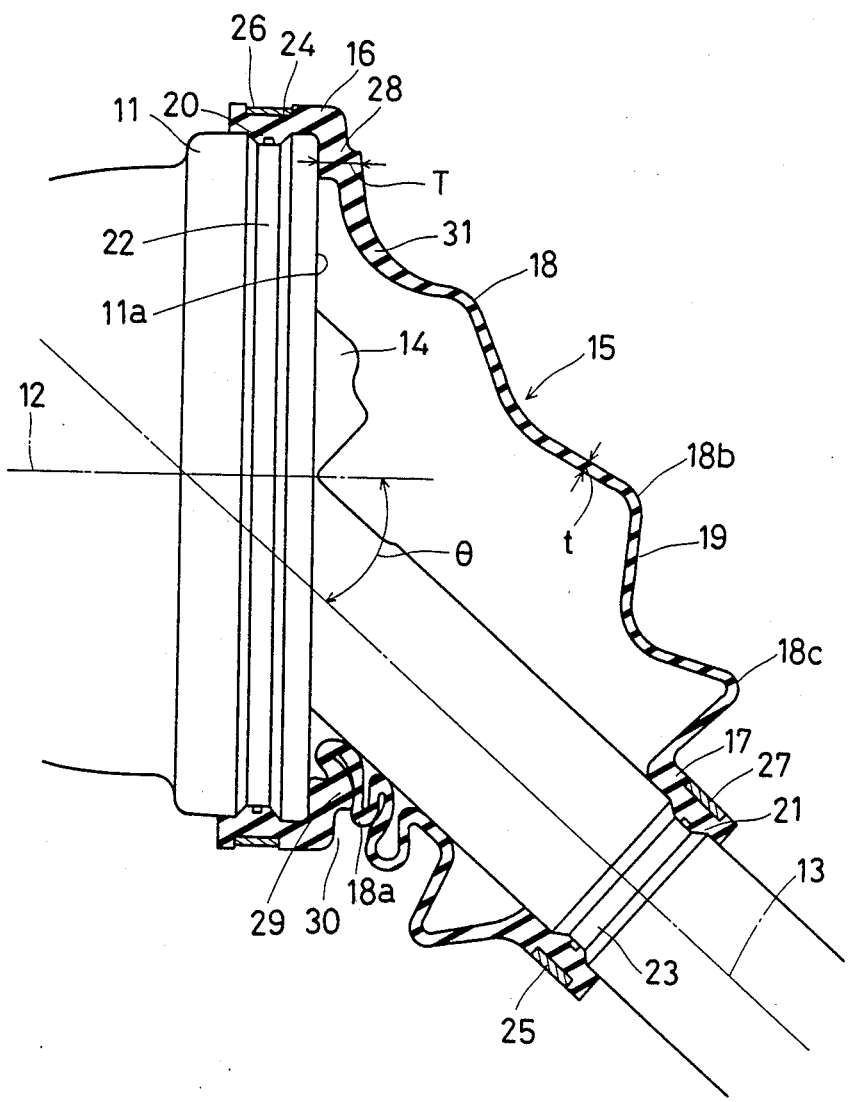
FIG. 2 is a vertical sectional view of the universal joint boot of FIG. 1 showing its deflexing state when a universal joint to which the boot is attached is flexed at a joint angle of more than 30°.
Figure 3:
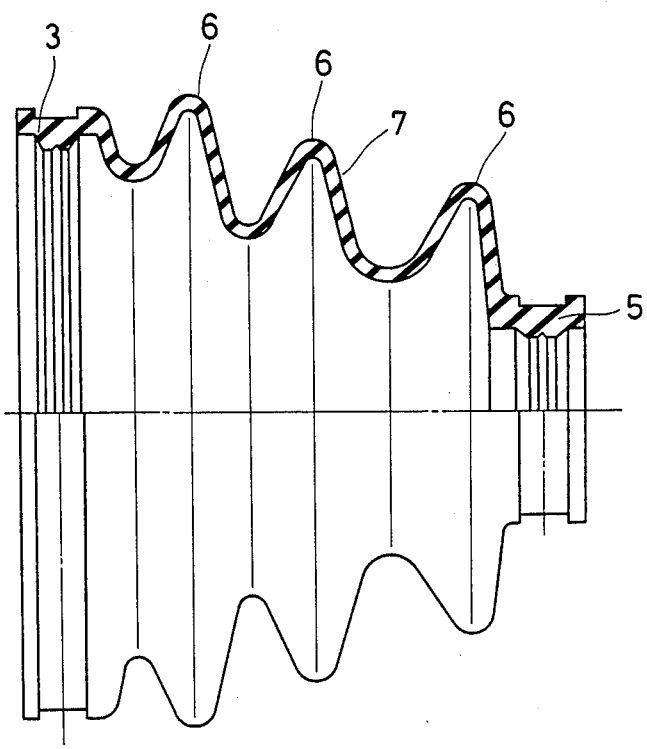
FIG. 3 is a vertical sectional view of a prior art boot for universal joints, with one-half thereof broken away.
Figure 4:
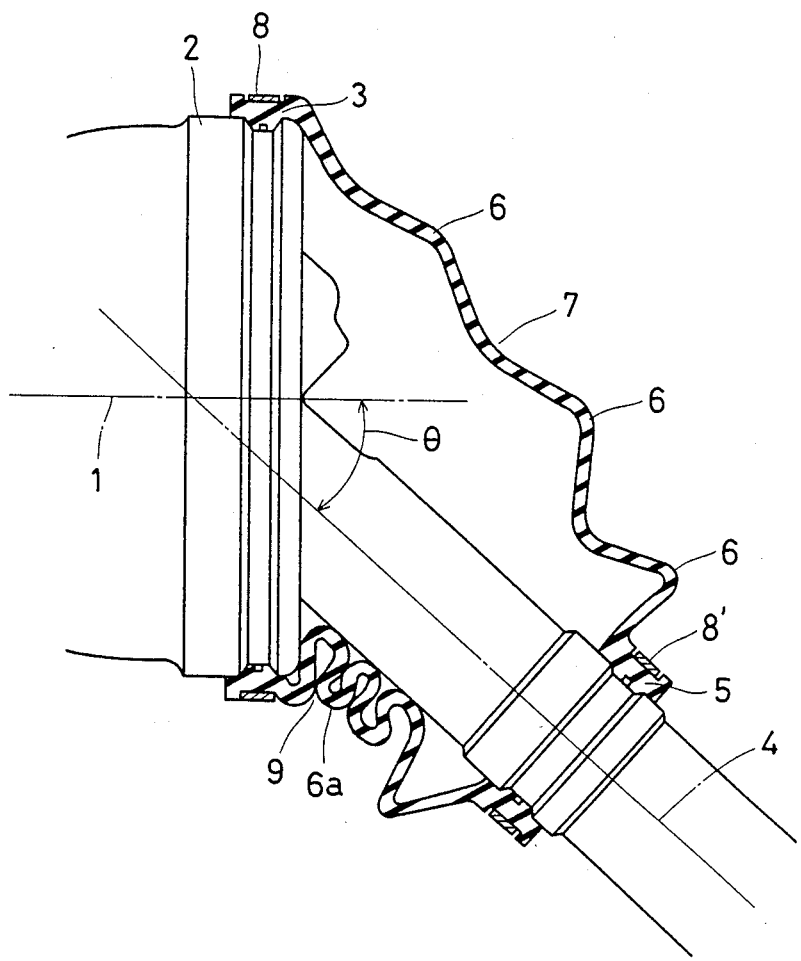
FIG. 4 is a vertical sectional view showing a state of the boot of FIG. 3 attached to a universal joint upon flexing.

As shown in FIG. 1 and FIG. 2, a boot 15 for a universal joint according to this invention comprises a large-diameter cylindrical portion 16 to be fitted on a driving shaft 13 which is connected to the joint case 11 through a universal joint 14 housed in it, at both ends thereof and an annular bellows portion 19 interconnecting between the large-diameter portion 16 and the small-diameter portion 17, the bellows portion including ridge portions 18 which have diameters tapering from the large-diameter portion 16 down to the small-diameter portion 17.

The boot 15 having the afore-mentioned fundamental construction is characterized by the integral formation of a bracing boss portion 28 as a steady member for interconnecting the radially inner end of the largediameter portion 16 and the end of the annular bellows portion 19 between them. The bracing boss portion 28 has a wall thickness of 2 to 3 times the average wall thickness (t) of the bellows portion 19 and is shaped so that the inner face thereof makes abutting contact with an edge face 11a of the joint case 11 and the outer face thereof is flush with the outer face of the bellows portion in the transitional area from the boss portion 28 to the bellows portion 19, whereby the boss portion 28 blends into the bellows portion 18 to form a smooth outer profile.

In the bellows portion 19, a first channel-like zone 31 adjacent to the boss portion 28 extending from the end of the crest of a first ridge portion 18a of it has wall thicknesses gradually increasing from the crest toward the end of the bellows portion, the maximum wall thickness being about a half the wall thickness of the boss portion 28.

In mounting the boot 15 for a universal joint thus constructed, the large-diameter cylindrical portion 16 is fitted onto the outer periphery of the joint case 11 housing therein the universal joint 14 and the smalldiameter cylindrical portion 17 onto the driving shaft 13, thus constituting a universal joint assembly.

When the universal joint in that state is flexed making a joint angle ($\theta$) of more than 30° and the boot is bent, the bellows portion 19 on its compressed side assumes such a deformation state that the terminal area thereof adjacent to the boss portion 28 is deflexed toward the joint case 11 side and bent at an acute angle and the sloping face of the first ridge portion 18a is in surface contact with the outer face of the bracing boss portion 28. As a consequence, the surface pressure exerted on that contact area is decreased because of the concentration of stress being avoided. Hence, occurrence of cracking is prevented in the area from the boss portion 28 to the adjacent zone 31 and longevity of the boot is significantly elongated.

On the other hand, when the joint case 11 and the driving shaft 13 are rotated at a revolution number on the order of 2300 r.p.m. corresponding to super high speed of a motor car, the bracing boss portion 28 as a steady member serves to support and reinforce the bellows portion 19, behaving like a retainer band or hoop, so that the bellows portion 19 is prevented from dilating, thus avoiding any interference in the surrounding components nearby.

DESCRIPTION OF THE PREFERRED EMBODIMENTS

In FIG. 1 one example of a construction of the universal joint boot 15 is illustrated whereas in FIG. 2 there is illustrated the boot thus constructed and mounted to the universal joint 14 in its bending state that a large joint angle is imparted to the universal joint.

The universal joint boot 15 made of rubber is attached to extend and interconnect between the joint case 11 secured to the end of a wheel shaft 12 and the driving shaft 13 which is linked to be rotatable at equal speed through the universal joint 14 housed in the joint case 11 to the wheel shaft 12.

The universal joint boot 15 has, at its one end, the large-diameter cylindrical portion 16 adapted to be fitted on the outer periphery of the joint case 11 and, at its other diametrically opposite end, the small-diameter cylindrical portions 17 adapted to be fitted on the outer periphery of the driving shaft 13, between which the bellows portion 19 is integrally formed to have three ridge portions 18a, 18b, 18c in the form of an arch in cross-section whose diameters are gradually decreased from the large-diameter portion 16 to the small-diameter portion 17, namely in this order.

The large-diameter portion 16 and the small-diameter portion 17, on the radially inside, are attached to the joint case 11 and the driving shaft 13, respectively by fitting rib-like projections having triangular cross-section 20 and 21 formed on the respective inner peripheries of them into concave grooves 22 and 23 which are defined, respectively, on the respective outer peripheries thereof whereas, on the radially outside, they are fastened firmly by fitting snap rings 26 and 27, respectively, onto peripheral grooves 24 and 25 defined on the respective outer peripheries. In this manner, the large-diameter portion 16 and the small-diameter portion 17 are liquidtightly mounted, without a grease sealed in the space within the bellows portion 19 leaking out.

The boss portion 28 as a bracing member extends joining the large-diameter portion 16 and the bellows portion 19 therebetween and has an wall thickness (T) of 4 to 6 mm equal to approximately 2 to 3 times the average wall thickness (t) (usually set to be 2 to 2.4 mm) of the bellows portion 19.

The inner face of the boss portion 28 is in abutting contact with the edge face 11a of the joint case 11 while the outer face of it is flush with the outer face of the terminal area of the bellows portion 19, whereby the boss portion 28 blends into smoothly the bellows portion 19 in the transitional area.

The first channel-like zone 31 of the bellows portion 19 extending between the border and the crest of the first ridge portion 18a is formed as an wall thickness-varying zone to have wall thicknesses gradually increasing from the first ridge portion 18a toward the border, maximum value of which is about a half (T/2) the wall thickness of the boss portion 28.

In a shoulder-like area extending from the largediameter portion 16 at its axially inner end to the boss portion 28, an offset recess 30 is defined, forming a rib-like protrusion 29 having an outside diameter ($D_2$) smaller than the outside diameter ($D_1$) of the large-diameter portion 16 by about one tenth. The rib-like protrusion 29, under flexing condition, retains its outer profile without buckling because of the presence of the stout boss portion 28.

The outside diameter ratio of the first ridge portion 18a to the rib-like protrusion 29 ($D_3/D_2$) is preferably determined to be about 0.9, whereby when the universal joint 14 is flexed at a joint angle of more than 30° (up to maximum joint angle:41.5°), the sloping face of the first ridge portion 18a comes into surface contact with the outer face of the boss portion 28, thus preventing any contact of the crest of first ridge portion 18a, particularly with the large-diameter portion 16 and the boss portion 28 and making the peripheral speeds of the mutual contact faces approach each other. As a consequence, because of the surface contact of the boss portion 28 and the sloping face of the first ridge portion 18a, mutual friction and wear is avoided and durability of the boot is significantly enhanced.

The height (h) of the offset recess 30 is preferred to be in the neighbourhood of 3 mm to avoid the contact between the crest of the first ridge portion 18a and the bottom of the offset recess 30.

Now, actions of the universal joint boot 15 having a construction as thus far described will be referred to. In mounting the boot 15 on the universal joint 14, first of all, the small-diameter cylindrical portion 17 is fitted on the driving shaft 13 and the large-diameter cylindrical portion 16 on the joint case 11. Then, the large-diameter portion 16 and the small-diameter portion 17 are fixed with fastening bands 26, 27 without any external stress being imposed on the bellows portion 19, concurrently with which a lubricant such as grease is sealed into the space within the boot 15. Thus, an assembly of the universal joint and boot is obtained.

When the universal joint and boot assembly is flexed at an abrupt joint angle ($\theta$) between the wheel shaft 12 and the driving shaft 13 of more than 30°, the boot 15 is deformed as illustrated in FIG. 2. That is, the first channel-like zone 31 of the bellows portion 19 adjoining the bracing boss portion 28 is flexed at an acute angle, with the slope of the first ridge portion 18a being in surface contact with the outer face of the bracing boss portion 28, which reduces the surface pressure on the contact area. Moreover, relative peripheral speeds in the contact area between the outer face of the bracing boss portion 28 and the slope of the first ridge portion 18a comes to approach to each other. Consequently, friction force between both is minimized, so that cracking due to wear is avoided.

When the wheel shaft 12 and the driving shaft 13 are rotated at a super high speed upward of 2300 r.p.m., the bracing boss portion 28 constitutes a highly self-sustaining annular support member in the vicinity of the large-diameter portion 16, and hence any dilation of that portion 28 toward the radially outward direction is suppressed in spite of the fact that the boss portion is a largest diameter part between the large-diameter portion and the small-diameter portion and centrifugal force acts most greatly on it. Break of the boot 15 is thus avoided.

According to this invention, as described above, the boot for universal joints is integrally provided, in a linking area between the bellows portion and the large-diameter portion, with the bracing boss portion having an wall thickness of 2 to 3 times the average wall thickness of the whole bellows portion. The boss portion is formed so that the inner face thereof contacts fittingly with the edge face of the joint case and the outer face thereof blends smoothly into the outer face of the bellows portion, making a flush surface. Further, the first channel-like zone of the bellows portion extending from the border to the crest position has wall thicknesses gradually decreasing from the latter to the former, the maximum thickness being about a half of the thickness of the boss portion.

Owing to the foregoing construction of the boot, flexing state of the area susceptible of compression ranging from the large-diameter portion to the first ridge portion of the bellows portion is much improved since the slope of the first ridge portion comes in surface contact with the outer face of the thick-gage boss portion, reducing the surface pressure on that contact area and relative peripheral speeds of that area approach to each other, whereby occurrence of cracking due to wear is avoided. Further, upon superhigh speed rotation of more than 2300 r.p.m., the presence of the bracing boss portion formed in the transitional area between the large-diameter portion and the bellows portion prevents dilation and rupture of the bellows portion ascribable to centrifugal force. Thus, the universal joint boot offers an advantageous effect of attaining a significantly long life.

We claim:

1. A boot for a universal joint for linking a driving shaft and a joint case, which boot is attached to cover the universal joint, interconnecting between the driving shaft and the joint case and is formed integrally of:

a large-diameter cylindrical portion adapted to be secured at one end to the joint case and a small-diameter cylindrical portion adapted to be secured at the other end to the driving shaft; a central annular bellows portion extending between said both portions, said bellows portion having ridge portions whose diameters are gradually decreased from the large-diameter portion to the small-diameter portion; and a bracing boss portion formed radially inwardly of said large-diameter portion to extend between it and said bellows portion;

said boss portion having a wall thickness of 2 to 3 times an average wall thickness of the bellows portion and being profiled at the inner face thereof to abuttingly contact with the edge face of the joint case and at the outer face thereof so that it blends smoothly into the outer face of the bellows portion in a flush surface with each other, said bellows portion having, at a zone on the large-diameter side extending from the end to the crest of a first ridge portion of a largest diameter thereof, wall thicknesses gradually increasing from the latter to the former, whose maximum value is a half the wall thickness of the boss portion.

2. A boot for universal joint as claimed in claim 1, wherein said boss portion is profiled to form a rib-like protrusion defining an offset to the large-diameter portion.

3. A boot for universal joint as claimed in claim 2, wherein the outside diameter ratio of said first ridge portion to said rib-like protrusion is about 0.9.

* * * * *